United States Patent
Lai et al.

(10) Patent No.: US 11,418,350 B2
(45) Date of Patent: Aug. 16, 2022

(54) MANAGEMENT SYSTEM AND METHOD FOR SECURE SIGNING OF CERTIFICATES

(71) Applicants: Yu-Cheng Lai, Hsinchu County (TW); Chia-Yen Lu, Hsinchu County (TW)

(72) Inventors: Yu-Cheng Lai, Hsinchu County (TW); Chia-Yen Lu, Hsinchu County (TW)

(73) Assignee: ECO-LUXURY TECHNOLOGY CO., LTD., Hsinchu County (TW)

( * ) Notice: Subject to any disclaimer, the term of this patent is extended or adjusted under 35 U.S.C. 154(b) by 0 days.

(21) Appl. No.: 17/111,401

(22) Filed: Dec. 3, 2020

(65) Prior Publication Data
US 2021/0306159 A1    Sep. 30, 2021

(30) Foreign Application Priority Data

Mar. 30, 2020  (TW) ................................. 109110833

(51) Int. Cl.
*H04L 9/32*    (2006.01)
*H04L 9/08*    (2006.01)

(52) U.S. Cl.
CPC .......... *H04L 9/3265* (2013.01); *H04L 9/0825* (2013.01); *H04L 9/0844* (2013.01); *H04L 9/0861* (2013.01)

(58) Field of Classification Search
CPC ... H04L 9/3265; H04L 9/0825; H04L 9/0844; H04L 9/0861; H04L 9/08; H04L 9/32; H04L 63/0823; H04L 63/126; H04L 9/3247; H04L 9/3268; H04L 29/06; H04L 9/3263; H04L 2209/38; H04L 9/006; H04L 2209/64; G06F 21/44; G06F 21/33; G06F 21/335; H04W 12/069; H04W 12/068; G06Q 20/02; G06Q 20/023; G06Q 20/027
See application file for complete search history.

(56) References Cited

U.S. PATENT DOCUMENTS

| | | | |
|---|---|---|---|
| 2004/0103283 A1* | 5/2004 | Hornak | H04L 9/3263 713/175 |
| 2004/0144840 A1* | 7/2004 | Lee | H04L 9/3234 235/380 |
| 2005/0076198 A1* | 4/2005 | Skomra | H04L 63/0823 713/156 |
| 2006/0106836 A1* | 5/2006 | Masugi | G06F 21/33 |
| 2012/0179907 A1* | 7/2012 | Byrd | H04L 9/3268 713/156 |

(Continued)

*Primary Examiner* — Techane Gergiso
(74) *Attorney, Agent, or Firm* — Che-Yang Chen; Law Office of Michael Chen (57) ABSTRACT

A management system and a method for secure signing of certificates, which have a certificate signing subsystem set up in a device of a controlled management site, unless authorized externally, internal data of the subsystem cannot be accessed arbitrarily, and each unit applying for a certificate needs confirmation of identity to increase the security of certificate application and signing. In addition, the certificate signing subsystem is a device with arithmetic capability, which operates fast and can increase the efficiency of certificate signing. Because units or companies applying for certificates do not need to set up a certificate signing system by themselves, provided that they are connected to the certificate signing subsystem of the present invention, certificates can be applied for and obtained, thereby saving business operating costs.

18 Claims, 6 Drawing Sheets

(56) References Cited

U.S. PATENT DOCUMENTS

| | | | |
|---|---|---|---|
| 2016/0246617 A1* | 8/2016 | Watsen | H04L 63/123 |
| 2017/0339144 A1* | 11/2017 | Han | H04L 9/3268 |
| 2019/0297499 A1* | 9/2019 | Hawkes | H04W 4/40 |
| 2019/0384586 A1* | 12/2019 | Jiang | G06F 8/65 |

* cited by examiner

MANAGEMENT SYSTEM AND METHOD FOR SECURE SIGNING OF CERTIFICATES

BACKGROUND OF THE INVENTION

Field of Invention

The present invention relates to the technical field of certificate application and signing, and more particularly to a management system and a method for secure signing of certificates.

Related Art

The existing certificate signing system is stored in a flash disk, after the flash disk is connected to a device of a manufacturing end, certificates are signed by the certificate signing system in the flash disk. However, signing certificates in such a way with the certificate signing system being stored in the flash disk that can be carried along arbitrarily, and there is no facility to protect internal files, so there is a great risk of being stolen by a third party. In addition, since such a certificate signing system is stored in a flash disk, the execution speed is poor. Moreover, the existing certificate signing system has to be set up by the unit that needs the certificate, which will increase the costs.

SUMMARY OF THE INVENTION

In view of the above problems, an object of the present invention is to provide a management system and a method for secure signing of certificates capable of solving the problems of poor security, slow execution speed and increased set up costs of the existing techniques.

In order to solve the above technical problems, one embodiment of the management system for secure signing of certificates of the present invention includes a certificate demand end, a certificate attaching subsystem, and a certificate signing subsystem. The certificate demand end uses an asymmetric algorithm to generate a pair of public key and private key. The private key cannot be accessed externally and requires authorization prior to access. The certificate attaching subsystem includes a certificate attaching unit, a certificate verification unit and a first verification unit. The certificate attaching unit is connected to the certificate demand end and used to add a certificate to the certificate demand end; the certificate verification unit is connected to the certificate attaching unit and has a certificate verification unit identification information; and the first verification unit is connected to the certificate verification unit and has secure arithmetic capability and requires authorization prior to access. The certificate signing subsystem includes a registration approval unit, a certificate signing unit, and a second verification unit. The registration approval unit is connected to the certificate verification unit and has a registration approval unit identification information; the certificate signing unit is connected to the registration approval unit and has a certificate signing unit identification information; and the second verification unit is connected to the registration approval unit and the certificate signing unit, and has secure arithmetic capability and requires authorization prior to access. The certificate attaching unit is trusted by the certificate verification unit, the certificate verification unit is trusted by the registration approval unit, and the registration approval unit is trusted by the certificate signing unit.

In order to solve the above technical problems, one embodiment of the management method for secure signing of certificates of the present invention includes the following steps: a certificate demand end using an asymmetric algorithm to generate a pair of public key and private key, and generating a certificate signing request based on the public key and the private key; a certificate attaching unit securely obtaining the certificate signing request from the certificate demand end; a certificate verification unit securely obtaining the certificate signing request from the certificate attaching unit; the certificate verification unit securely sending the certificate signing request to a registration approval unit; the registration approval unit securely sending the certificate signing request to a certificate signing unit; the certificate signing unit using a certificate signing unit private key stored in a second verification unit to sign a certificate for the certificate signing request; the certificate signing unit securely sending the certificate to the certificate attaching unit through the registration approval unit and the certificate verification unit; and the certificate attaching unit adding the certificate to the certificate demand end.

In order to solve the above technical problems, another embodiment of the management method for secure signing of certificates of the present invention includes the following steps: a certificate demand end generating a pair of public key and private key; a certificate attaching unit securely obtaining the public key from the certificate demand end; a certificate verification unit securely obtaining the public key from the certificate attaching unit; the certificate verification unit using the public key to generate a certificate signing request of the certificate demand end; the certificate verification unit securely sending the certificate signing request to a registration approval unit; the registration approval unit securely sending the certificate signing request to a certificate signing unit; the certificate signing unit using a certificate signing unit private key stored in a second verification unit to sign a certificate for the certificate signing request; the certificate signing unit securely sending the certificate to the certificate attaching unit through the registration approval unit and the certificate verification unit; and the certificate attaching unit adding the certificate to the certificate demand end.

In the management system and the method for secure signing of certificates of the present invention, the certificate signing subsystem is set up in a device of a controlled management site, unless authorized externally, internal data of the subsystem cannot be accessed arbitrarily, and each of the units applying for a certificate needs confirmation of identity to increase the security of certificate application and signing. In addition, the certificate signing subsystem is a device with arithmetic capability, which operates fast and can increase the efficiency of certificate signing. Because units or companies applying for certificates do not need to set up a certificate signing system by themselves, provided that they are connected to the certificate signing subsystem of the present invention, certificates can be applied for and obtained, thereby saving business operating costs.

DETAILED DESCRIPTION OF THE INVENTION

Figure 1:
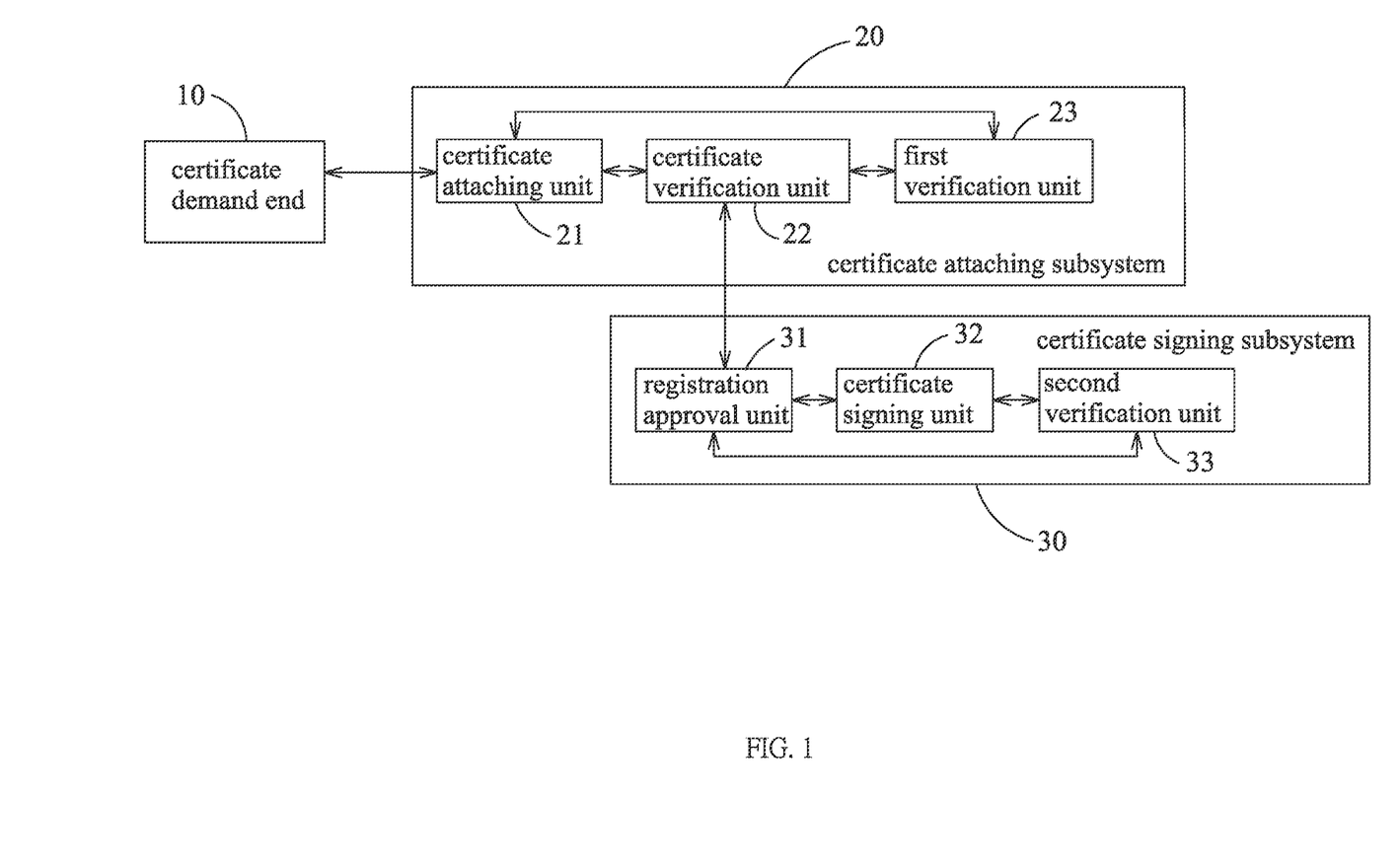
FIG. 1 is a block diagram of one embodiment of a management system for secure signing of certificates of the present invention.

Please refer to FIG. 1 for one embodiment of a management system for secure signing of certificates of the present invention. A management system for secure signing of certificates 100 of the present invention includes a certificate demand end 10, a certificate attaching subsystem 20, and a certificate signing subsystem 30.

The certificate demand end 10 uses an asymmetric algorithm to generate a pair of public key and private key. The private key cannot be accessed externally and requires authorization prior to access. In this embodiment, the private key is stored in a security-protected unit of the certificate demand end 10, and the private key cannot be read externally. The certificate demand end 10 uses the public key to generate a certificate signing request (CSR).

The certificate attaching subsystem 20 includes a certificate attaching unit 21, a certificate verification unit 22, and a first verification unit 23. The certificate attaching unit 21 is connected to the certificate demand end 10, and is used to add a certificate to the certificate demand end 10. The certificate verification unit 22 is connected to the certificate attaching unit 21 and has a certificate verification unit identification information. The first verification unit 23 is connected to the certificate verification unit 22 and has secure arithmetic capability and requires authorization prior to access. The first verification unit 23 generates a set of public key and private key corresponding to the certificate attaching unit 21 and the certificate verification unit 22 respectively. The private keys of the certificate attaching unit 21 and the certificate verification unit 22 are stored in the first verification unit 23, and the private keys cannot be accessed externally. The public keys of the certificate attaching unit 21 and the certificate verification unit 22 are respectively sent to an upper-level certificate signing unit to sign a certificate of certificate attaching unit and a certificate of certificate verification unit. The certificate attaching unit 21 has a certificate attaching unit identification information, and the certificate of certificate attaching unit is bound to the certificate attaching unit identification information. Similarly, the certificate verification unit 22 has the certificate verification unit identification information, and the certificate of certificate verification unit is bound to the certificate verification unit identification information. Thereby, when the certificate attaching unit 21 sends data, identity of the certificate attaching unit 21 can be identified by operating the certificate attaching unit identification information bound with the certificate of certificate attaching unit and the private key stored in the first verification unit 23. Similarly, when the certificate verification unit 22 sends data, identity of the certificate verification unit 22 can be identified by operating the certificate verification unit identification information bound with the certificate of certificate verification unit and the private key stored in the first verification unit 23. In this way, on a path of information transfer, each of the units needs to confirm its identity before transferring to ensure the security of transfer. Moreover, the private keys for confirming identity cannot be accessed from outside of the first verification unit 23 to further enhance the security and accuracy of identity identification.

The certificate signing subsystem 30 includes a registration approval unit 31, a certificate signing unit 32, and a second verification unit 33. The registration approval unit 31 is connected to the certificate verification unit 22 and has a registration approval unit identification information; the certificate signing unit 32 is connected to the registration approval unit 31 and has a certificate signing unit identification information; and the second verification unit 33 is connected to the registration approval unit 31 and the certificate signing unit 32, and has secure arithmetic capability and requires authorization prior to access. The second verification unit 33 generates a set of public key and private key corresponding to the registration approval unit 31 and the certificate signing unit 32 respectively. The private keys of the registration approval unit 31 and the certificate signing unit 32 are stored in the second verification unit 33 and cannot be accessed externally. The public keys of the registration approval unit 31 and the certificate signing unit 32 are sent to the upper-level certificate signing unit 32 to sign a certificate of registration approval unit and a certificate of certificate signing unit. The registration approval unit 31 has the registration approval unit identification information, and the certificate of registration approval unit is bound to the registration approval unit identification information. The certificate signing unit 32 has the certificate signing unit identification information, and the certificate of certificate signing unit is bound to the certificate signing unit identification information. Thereby, when the registration approval unit 31 sends data, identity of the registration approval unit 31 can be identified by operating the registration approval unit identification information bound with the certificate of registration approval unit and the private key stored in the second verification unit 33. Similarly, when the certificate signing unit 32 sends data, identity of the certificate signing unit 32 can be identified by operating the certificate signing unit identification information bound with the certificate of certificate signing unit and the private key stored in the second verification unit 33. In this way, on a path of information transfer, each of the units needs to confirm its identity before transferring to ensure the security of transfer. Moreover, the private keys for confirming identity cannot be accessed from outside of the second verification unit 33 to further enhance the security and accuracy of identity identification.

The certificate verification unit 22 of the certificate attaching subsystem 20 is connected to the registration approval unit 31 of the certificate signing subsystem 30. When the certificate verification unit 22 sends a certificate signing request to the registration approval unit 31, the registration approval unit 31 also needs to verify identity of the certificate verification unit 22. In this embodiment, identity of the certificate verification unit 22 is verified in the following way. The certificate verification unit 22 sends its public key to the registration approval unit 31. The registration approval unit 31 uses a random program to generate a random number and uses the public key sent by the certificate verification unit 22 to encrypt the random number, and sends the encrypted random number to the certificate verification unit 22. The certificate verification unit 22 sends the encrypted random number to the first verification unit 23 for decryption. The certificate verification unit 22 sends the decrypted random number back to the registration approval unit 31. The registration approval unit 31 checks whether the decrypted random number matches the originally generated random number, if matched, it means that the certificate verification unit 22 has passed the identity verification.

Through the above process, the certificate attaching unit 21 is trusted by the certificate verification unit 22, the certificate verification unit 22 is trusted by the registration approval unit 31, and the registration approval unit 31 is trusted by the certificate signing unit 32; thus a chain of trust is formed. The certificate verification unit 22 can securely send a certificate signing request to the certificate signing unit 32 through the registration approval unit 31, the certificate signing unit 32 signs a certificate via the second verification unit 33, the certificate is sent to the certificate attaching unit 21 through the registration approval unit 31 and the certificate verification unit 22, and the certificate attaching unit 21 adds the certificate to the certificate demand end 10.

Figure 3:
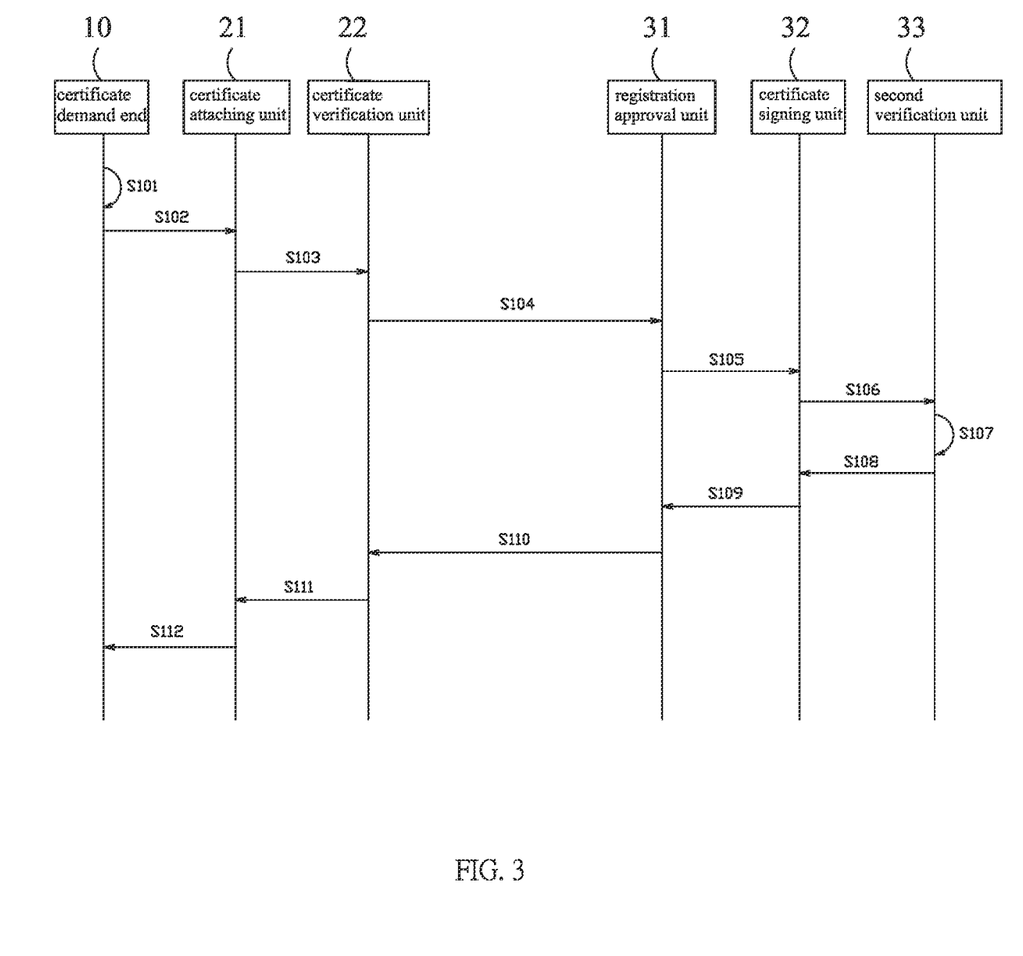
FIG. 3 is a schematic diagram of one embodiment of a management method for secure signing of certificates of the present invention.
Figure 4:
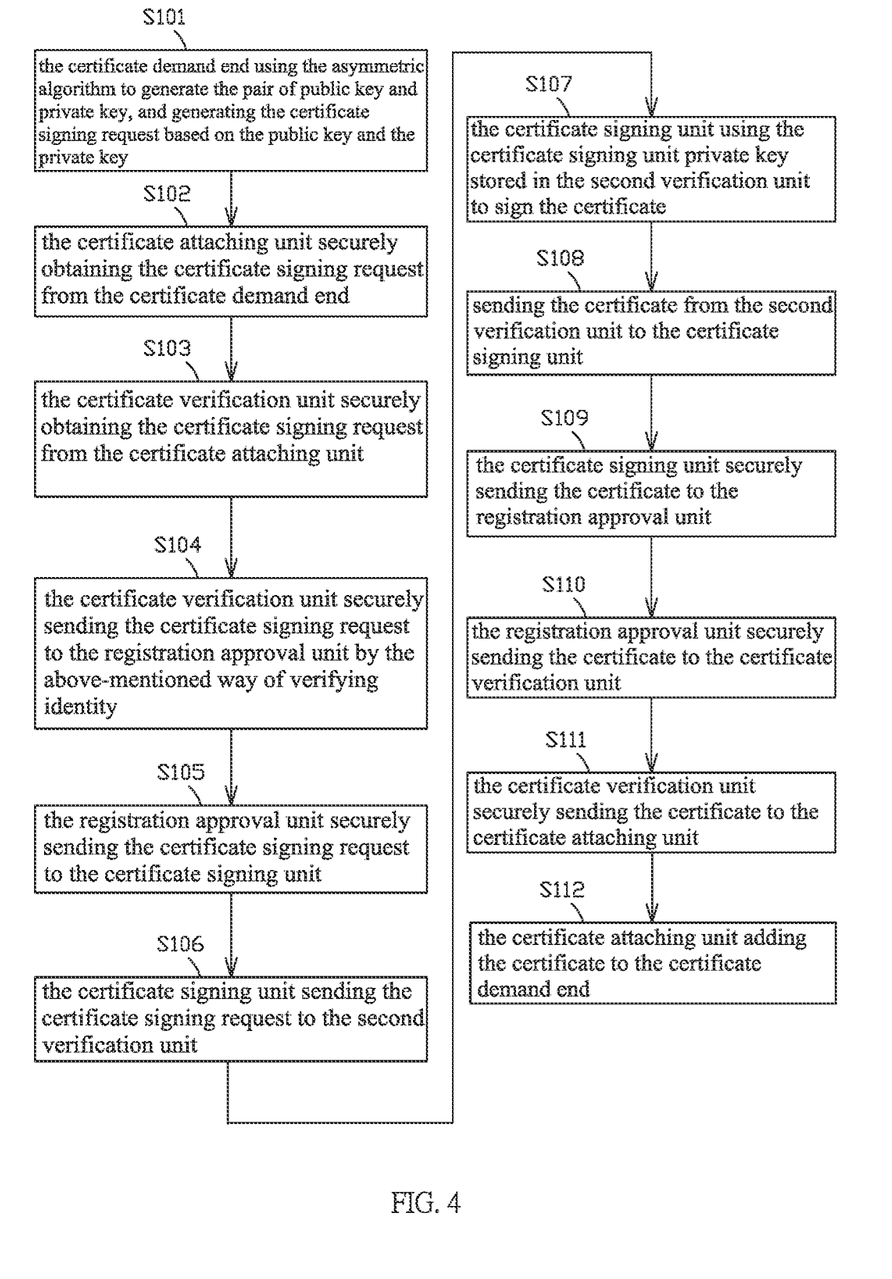
FIG. 4 is a flowchart of the management method for secure signing of certificates of FIG. 3.

Please refer to FIG. 3 and FIG. 4 for one embodiment of a management method for secure signing of certificates of the present invention. Please refer to FIG. 1 as well, firstly in step S101, a certificate demand end 10 using an asymmetric algorithm to generate a pair of public key and private key, and generating a certificate signing request based on the public key and the private key;

then proceeding to step S102, in step S102, the certificate attaching unit 21 securely obtaining the certificate signing request from the certificate demand end 10;

then proceeding to step S103, in step S103, the certificate verification unit 22 securely obtaining the certificate signing request from the certificate attaching unit 21 by the above-mentioned way of verifying identity;

then proceeding to step S104, in step S104, the certificate verification unit 22 securely sending the certificate signing request to the registration approval unit 31 by the above-mentioned way of verifying identity;

then proceeding to step S105, in step S105, the registration approval unit 31 securely sending the certificate signing request to the certificate signing unit 32;

then proceeding to step S106, in step S106, the certificate signing unit 32 sending the certificate signing request to the second verification unit 33;

then proceeding to step S107, in step S107, the certificate signing unit 32 using a certificate signing unit private key stored in the second verification unit 33 to sign a certificate for the certificate signing request;

then proceeding to step S108, in step S108, sending the certificate from the second verification unit 33 to the certificate signing unit 32;

then proceeding to step S109, in step S109, the certificate signing unit 32 securely sending the certificate to the registration approval unit 31 by the above-mentioned way of verifying identity;

then proceeding to step S110, in step S110, the registration approval unit 31 securely sending the certificate to the certificate verification unit 22 by the above-mentioned way of verifying identity;

then proceeding to step S111, in step S111, the certificate verification unit 22 securely sending the certificate to the certificate attaching unit 21; and then proceeding to step S112, in step S112, the certificate attaching unit 21 adding the certificate to the certificate demand end 10.

Figure 2:
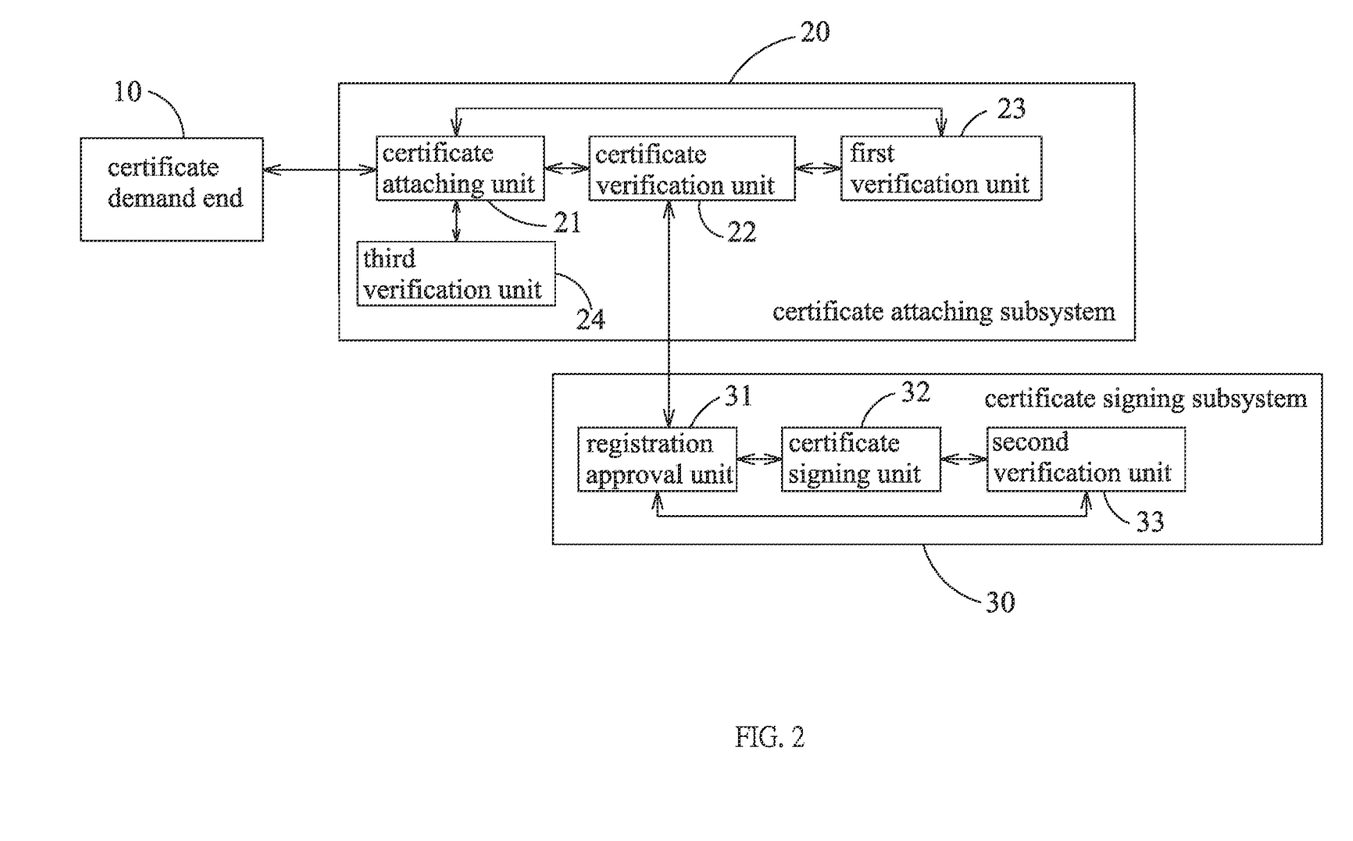
FIG. 2 is a block diagram of another embodiment of the management system for secure signing of certificates of the present invention.

Please refer to FIG. 2 for another embodiment of the management system for secure signing of certificates of the present invention. The structure of this embodiment is substantially the same as that of the embodiment of FIG. 1, so the same elements are given the same numerals and their descriptions will not be repeated here. The difference between this embodiment and the embodiment of FIG. 1 is that the certificate attaching subsystem 20 of this embodiment further includes a third verification unit 24. The certificate attaching unit 21 is connected to the third verification unit 24. The certificate attaching unit 21 has the certificate attaching unit identification information. The third verification unit 24 generates certificate attaching unit public and private keys, applies for a certificate of certificate attaching unit from the common upper-level certificate signing unit 32 based on the certificate attaching unit public and private keys, and binds the certificate attaching unit identification information with the certificate of certificate attaching unit, and the certificate attaching unit 21 is trusted by the certificate verification unit 22. The third verification unit 24 can be set up using a low cost device to reduce the overall equipment set up costs.

Figure 5:
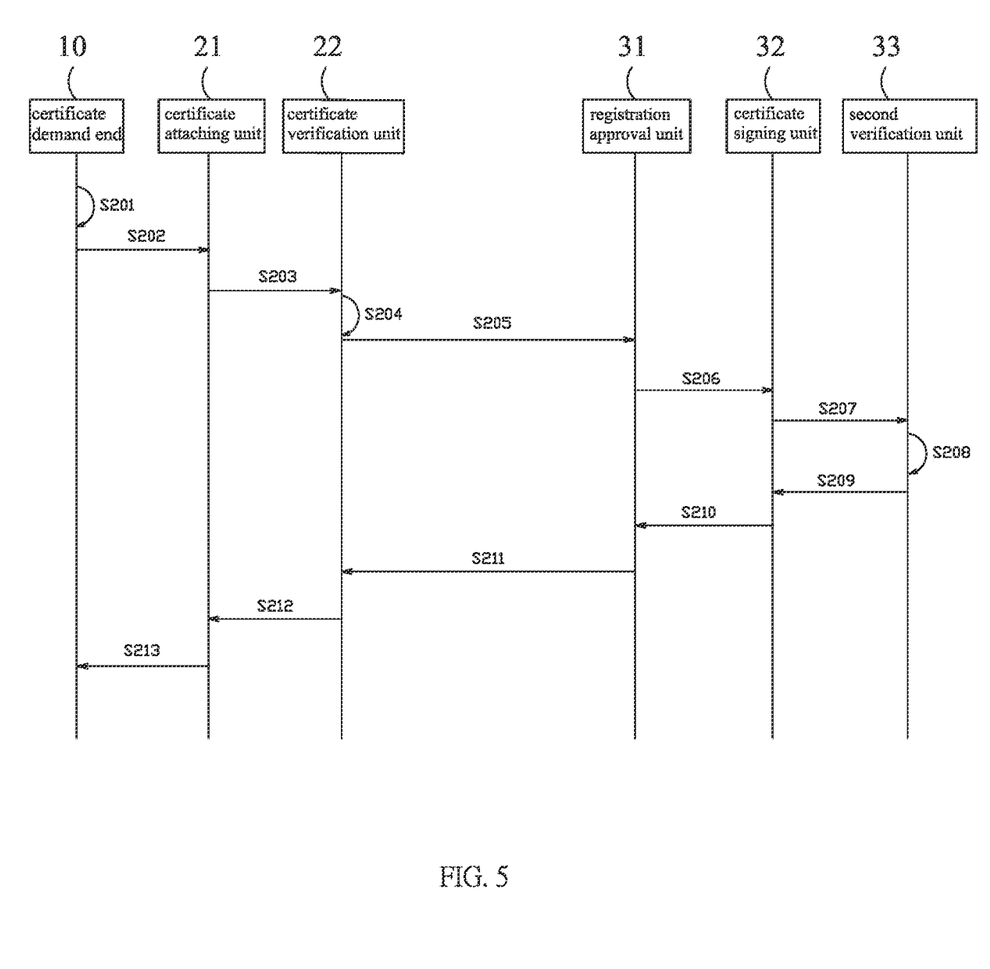
FIG. 5 is a schematic diagram of another embodiment of the management method for secure signing of certificates of the present invention.
Figure 6:
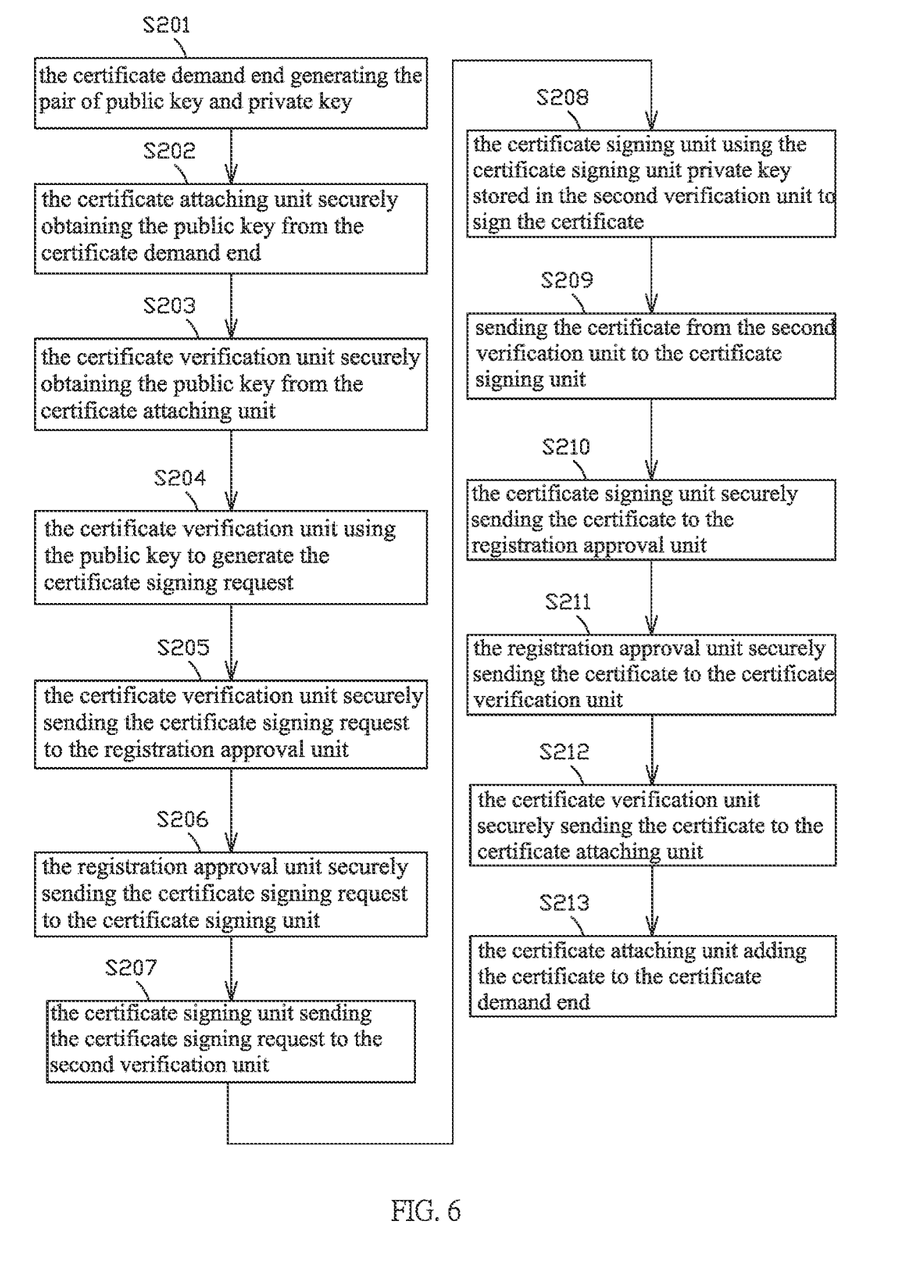
FIG. 6 is a flowchart of the management method for secure signing of certificates of FIG. 5.

Please refer to FIG. 5 and FIG. 6 for another embodiment of the management method for secure signing of certificates of the present invention. Please refer to FIG. 2 as well, in this embodiment, the certificate demand end 10 generates a pair of public key and private key, the certificate demand end 10 itself does not generate a certificate signing request, but sends the public key to the certificate verification unit 22 instead, and the certificate verification unit 22 generates the certificate signing request.

Firstly in step S201, the certificate demand end 10 generating a pair of public key and private key;

then proceeding to step S202, in step S202, the certificate attaching unit 21 securely obtaining the public key from the certificate demand end 10;

then proceeding to step S203, in step S203, the certificate verification unit 22 securely obtaining the public key from the certificate attaching unit 21;

then proceeding to step S204, in step S204, the certificate verification unit 22 using the public key to generate a certificate signing request of the certificate demand end 10;

then proceeding to step S205, in step S205, the certificate verification unit 22 securely sending the certificate signing request to the registration approval unit 31;

then proceeding to step S206, in step S206, the registration approval unit 31 securely sending the certificate signing request to the certificate signing unit 32;

then proceeding to step S207, in step S207, the certificate signing unit 32 sending the certificate signing request to the second verification unit 33;

then proceeding to step S208, in step S208, the certificate signing unit 32 using a certificate signing unit private key stored in the second verification unit 33 to sign a certificate for the certificate signing request;

then proceeding to step S209, in step S209, sending the certificate from the second verification unit 33 to the certificate signing unit 32;

then proceeding to step S210, in step S210, the certificate signing unit 32 securely sending the certificate to the registration approval unit 31 by the above-mentioned way of verifying identity;

then proceeding to step S211, in step S211, the registration approval unit 31 securely sending the certificate to the certificate verification unit 22 by the above-mentioned way of verifying identity;

then proceeding to step S212, in step S212, the certificate verification unit 22 securely sending the certificate to the certificate attaching unit 21; and then proceeding to step S213, in step S213, the certificate attaching unit 21 adding the certificate to the certificate demand end 10.

In the management system and the method for secure signing of certificates of the present invention, the certificate signing subsystem is set up in a device of a controlled management site, unless authorized externally, internal data of the subsystem cannot be accessed arbitrarily, and each of the units applying for a certificate needs confirmation of identity to increase the security of certificate application and signing. In addition, the certificate signing subsystem is a device with arithmetic capability, which operates fast and can increase the efficiency of certificate signing. Because units or companies applying for certificates do not need to set up a certificate signing system by themselves, provided that they are connected to the certificate signing subsystem of the present invention, certificates can be applied for and obtained, thereby saving business operating costs.

It is to be understood that the above description is only preferred embodiments of the present invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:

1. A management system for secure signing of certificates including:
   a certificate demand end using an asymmetric algorithm to generate a pair of public key and private key, the private key being unable to be accessed externally and requiring authorization prior to access;
   a certificate attaching subsystem including:
     a certificate attaching unit connected to the certificate demand end and used for adding a certificate to the certificate demand end;
     a certificate verification unit connected to the certificate attaching unit and having a certificate verification unit identification information; and
     a first verification unit connected to the certificate verification unit and having secure arithmetic capability and for requiring authorization prior to access; and
   a certificate signing subsystem including:
     a registration approval unit connected to the certificate verification unit and having a registration approval unit identification information;
     a certificate signing unit connected to the registration approval unit and having a certificate signing unit identification information; and
     a second verification unit connected to the registration approval unit and the certificate signing unit, and having secure arithmetic capability and requiring authorization prior to access;
   wherein the certificate attaching unit is trusted by the certificate verification unit, the certificate verification unit is trusted by the registration approval unit, and the registration approval unit is trusted by the certificate signing unit.

2. The management system for secure signing of certificates as claimed in claim 1, wherein the first verification unit is for generating certificate verification unit public and private keys, for applying for a certificate of certificate verification unit from the common upper-level certificate signing unit based on the certificate verification unit public and private keys, and for binding the certificate verification unit identification information with the certificate of certificate verification unit.

3. The management system for secure signing of certificates as claimed in claim 2, wherein the first verification unit is connected to the certificate attaching unit, the certificate attaching unit has a certificate attaching unit identification information, the first verification unit is for generating certificate attaching unit public and private keys, for applying for a certificate of certificate attaching unit from the common upper-level certificate signing unit based on the certificate attaching unit public and private keys, and for binding the certificate attaching unit identification information with the certificate of certificate attaching unit, and the certificate attaching unit is trusted by the certificate verification unit.

4. The management system for secure signing of certificates as claimed in claim 2, wherein the certificate attaching unit is connected to a third verification unit, the certificate attaching unit has a certificate attaching unit identification information, the third verification unit is for generating certificate attaching unit public and private keys, for applying for a certificate of certificate attaching unit from the common upper-level certificate signing unit based on the certificate attaching unit public and private keys, and for binding the certificate attaching unit identification information with the certificate of certificate attaching unit, and the certificate attaching unit is trusted by the certificate verification unit.

5. The management system for secure signing of certificates as claimed in claim 2, wherein the registration approval unit has a registration approval unit identification information, the second verification unit is for generating registration approval unit public and private keys, for applying for a certificate of registration approval unit from the common upper-level certificate signing unit based on the registration approval unit public and private keys, and for binding the registration approval unit identification information with the certificate of registration approval unit, and the certificate verification unit is trusted by the registration approval unit.

6. The management system for secure signing of certificates as claimed in claim 5, wherein the second verification unit is connected to the certificate signing unit, the certificate signing unit has a certificate signing unit identification information, the second verification unit is for generating certificate signing unit public and private keys, for applying for a certificate of certificate signing unit from the common upper-level certificate signing unit based on the certificate signing unit public and private keys, and for binding the certificate signing unit identification information with the certificate of certificate signing unit, and the registration approval unit is trusted by the certificate signing unit.

7. The management system for secure signing of certificates as claimed in claim 1, wherein the first verification unit is connected to the certificate attaching unit, the certificate attaching unit has a certificate attaching unit identification information, the first verification unit is for generating certificate attaching unit public and private keys, for applying for a certificate of certificate attaching unit from the common upper-level certificate signing unit based on the certificate attaching unit public and private keys, and for binding the certificate attaching unit identification information with the certificate of certificate attaching unit, and the certificate attaching unit is trusted by the certificate verification unit.

8. The management system for secure signing of certificates as claimed in claim 1, wherein the certificate attaching unit is connected to a third verification unit, the certificate attaching unit has a certificate attaching unit identification information, the third verification unit is for generating certificate attaching unit public and private keys, for applying for a certificate of certificate attaching unit from the common upper-level certificate signing unit based on the certificate attaching unit public and private keys, and for binding the certificate attaching unit identification information with the certificate of certificate attaching unit, and the certificate attaching unit is trusted by the certificate verification unit.

9. The management system for secure signing of certificates as claimed in claim 1, wherein the second verification unit is connected to the registration approval unit, the registration approval unit has a registration approval unit identification information, the second verification unit is for generating registration approval unit public and private keys, for applying for a certificate of registration approval unit from the common upper-level certificate signing unit based on the registration approval unit public and private keys, and for binding the registration approval unit identification information with the certificate of registration approval unit, and the certificate verification unit is trusted by the registration approval unit.

10. The management system for secure signing of certificates as claimed in claim 9, wherein the second verification unit is connected to the certificate signing unit, the certificate signing unit has a certificate signing unit identification information, the second verification unit is for generating certificate signing unit public and private keys, for applying for a certificate of certificate signing unit from the common upper-level certificate signing unit based on the certificate signing unit public and private keys, and for binding the certificate signing unit identification information with the certificate of certificate signing unit, and the registration approval unit is trusted by the certificate signing unit.

11. The management system for secure signing of certificates as claimed in claim 1, wherein the certificate demand end is for generating a pair of public key and private key, and for generating a certificate signing request based on the public key and the private key, and the certificate verification unit is capable of securely obtaining the certificate signing request through the certificate attaching unit.

12. The management system for secure signing of certificates as claimed in claim 11, wherein the certificate verification unit is for securely sending the certificate signing request to the certificate signing unit through the registration approval unit.

13. The management system for secure signing of certificates as claimed in claim 12, wherein the certificate signing unit signs is for signing a certificate through the second verification unit, the certificate is sent to the certificate attaching unit through the registration approval unit and the certificate verification unit, and the certificate attaching unit is for adding the certificate to the certificate demand end.

14. The management system for secure signing of certificates as claimed in claim 1, wherein the certificate demand end is for generating a pair of public key and private key, the certificate verification unit is for securely obtaining the public key through the certificate attaching unit and for generating a certificate signing request of the certificate demand end based on the public key.

15. The management system for secure signing of certificates as claimed in claim 14, wherein the certificate verification unit is for securely sending the certificate signing request to the certificate signing unit through the registration approval unit.

16. The management system for secure signing of certificates as claimed in claim 15, wherein the certificate signing unit is for signing a certificate through the second verification unit, the certificate is sent to the certificate attaching unit through the registration approval unit and the certificate verification unit, and the certificate attaching unit is for adding the certificate to the certificate demand end.

17. A management method for secure signing of certificates including following steps:
   using an asymmetric algorithm to generate a pair of public key and private key, and generating a certificate signing request based on the public key and the private key by a certificate demand end;
   securely obtaining the certificate signing request from the certificate demand end by a certificate attaching unit;
   securely obtaining the certificate signing request from the certificate attaching unit by a certificate verification unit;
   securely sending the certificate signing request to a registration approval unit from the certificate verification unit;
   securely sending the certificate signing request to a certificate signing unit from the registration approval unit;
   using a certificate signing unit private key stored in a second verification unit to sign a certificate for the certificate signing request by the certificate signing unit;
   securely sending the certificate to the certificate attaching unit through the registration approval unit and the certificate verification unit from the certificate signing unit; and
   adding the certificate to the certificate demand end by the certificate attaching unit.

18. A management method for secure signing of certificates including following steps:
   generating a pair of public key and private key by a certificate demand end;
   securely obtaining the public key from the certificate demand end by a certificate attaching unit;
   securely obtaining the public key from the certificate attaching unit by a certificate verification unit;
   using the public key to generate a certificate signing request of the certificate demand end by the certificate verification unit;
   securely sending the certificate signing request to a registration approval unit by the certificate verification unit;
   securely sending the certificate signing request to a certificate signing unit from the registration approval unit;
   using a certificate signing unit private key stored in a second verification unit to sign a certificate for the certificate signing request by the certificate signing unit;
   securely sending the certificate to the certificate attaching unit through the registration approval unit and the certificate verification unit by the certificate signing unit; and
   adding the certificate to the certificate demand end by the certificate attaching unit.

\* \* \* \* \*